United States Patent [19]

Jensen et al.

[11] Patent Number: 5,000,635

[45] Date of Patent: Mar. 19, 1991

[54] SPRING-LOADED OUTBOARD SIDE LOCK

[75] Inventors: Tom M. Jensen, Kirkland; Thomas H. Shorey, Mill Creek, both of Wash.

[73] Assignee: The Boeing Company, Seattle, Wash.

[21] Appl. No.: 439,255

[22] Filed: Nov. 17, 1989

[51] Int. Cl.⁵ .............................................. B60P 1/00
[52] U.S. Cl. ...................................... 410/86; 410/77; 410/87
[58] Field of Search ...................... 410/77, 76, 81, 83, 410/86, 87, 88, 89, 67, 107, 111

[56] References Cited

U.S. PATENT DOCUMENTS

| | | | |
|---|---|---|---|
| 1,786,495 | 12/1930 | Kellett | 410/88 |
| 2,047,954 | 7/1936 | Fitch | 410/88 |
| 2,070,613 | 2/1937 | Norbom | 105/392 |
| 2,115,064 | 4/1938 | Dwyer | 410/88 |
| 2,519,721 | 8/1950 | Taylor | 410/67 |
| 3,210,038 | 10/1965 | Bader et al. | 410/77 |
| 3,259,400 | 7/1966 | Tantlinger et al. | 410/81 |
| 4,234,278 | 11/1980 | Harshman et al. | 410/69 |
| 4,236,853 | 12/1980 | Niggemeier et al. | 410/76 |
| 4,339,148 | 7/1982 | Smith et al. | 410/77 X |
| 4,696,609 | 9/1987 | Cole | 410/69 |

Primary Examiner—Frank E. Werner
Assistant Examiner—James T. Eller, Jr.
Attorney, Agent, or Firm—Christensen, O'Connor, Johnson & Kindness

[57] ABSTRACT

A spring-loaded outboard side lock for restraining the movement of a cargo body. The outboard side lock (10) includes a base (20) secured to the outboard sides of a main cargo deck (12), the base having a guideway (38) in which a plunger (22) is slidably mounted. The plunger has formed in it a recess (44) and a pair of abutment walls (52) that extend generally perpendicular to the bottom of the plunger. An actuator (54) is disposed within the recess and is coupled to a lever (24) for reciprocal movement, and a pair of springs (50) extend between a pair of transverse spring abutting wings (64) of the actuator and the abutment walls of the plunger. Activation of the lever moves the actuator toward the cargo body (16) to be restrained, whereby the transverse spring abutting wings of the actuator act against the springs, which act against the abutment walls, to urge the plunger into engagement with the cargo body to restrain its movement and to maintain engagement in the event the cargo body attempts to move away from the outboard side lock. Deactivation of the lever causes the plunger to disengage the cargo body, thereby permitting its movement.

5 Claims, 5 Drawing Sheets

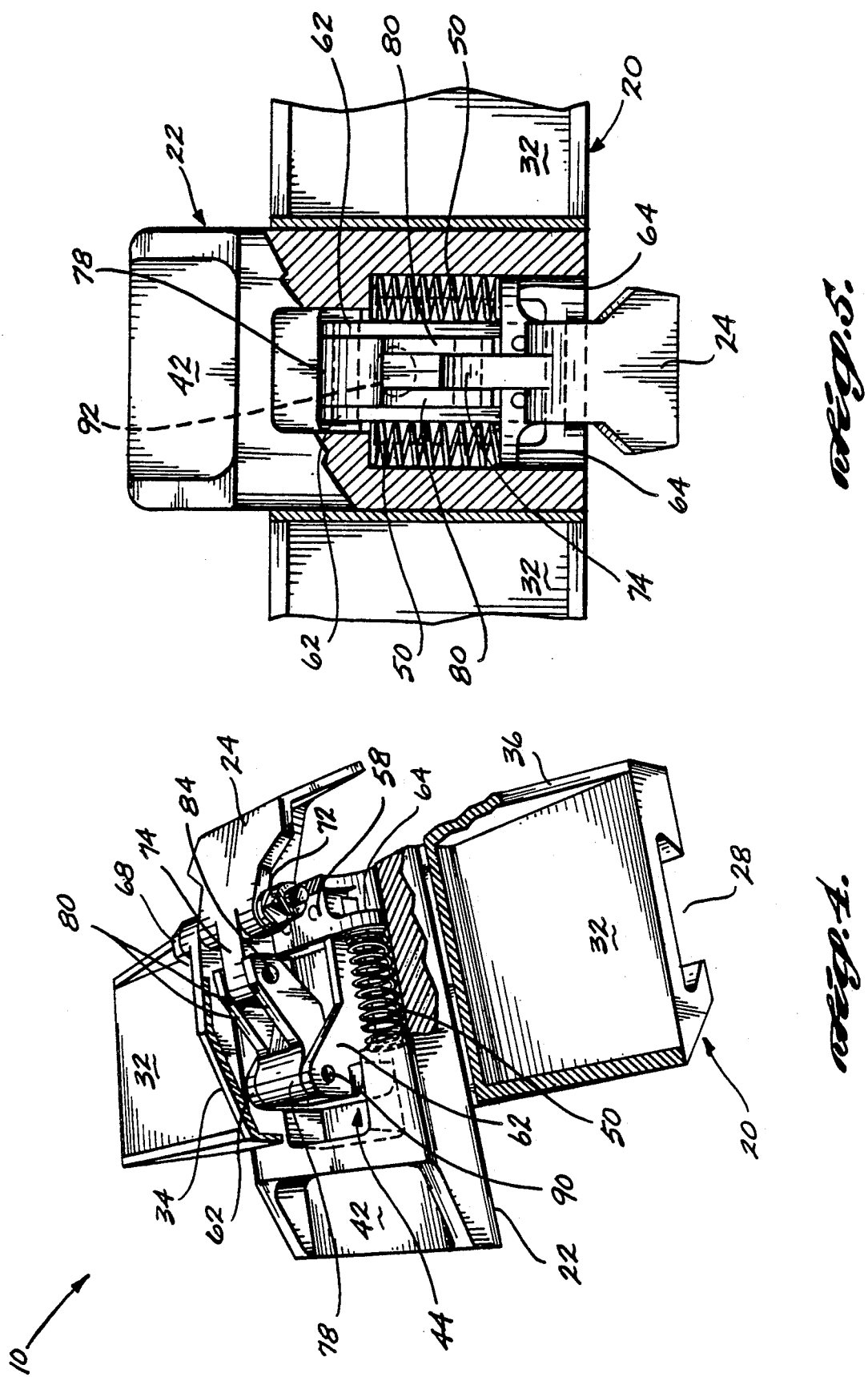

SPRING-LOADED OUTBOARD SIDE LOCK

TECHNICAL FIELD

This invention relates to restraint devices and, more specifically, to locks particularly useful in restraining cargo along the outboard sides of an airplane.

BACKGROUND OF THE INVENTION

In most large airplanes, it is standard for floor beams to run in a lateral direction, except in the wing box section where the floor beams run in a forward and aft direction. As a result, the floor beams over the wing box flex (i.e., expand and contract laterally) with movement of the wings. While this flexing may occur at any stage of the airplane's flight, it is most pronounced as the wings bounce up and down during taxiing, especially at high gross weights. With airplanes that carry fuel in their wings, the wings have an even lower resting position and the resulting wing bounce exerts even greater flexing to the floor beams than is found in airplanes not carrying fuel in this manner.

In cargo airplanes, loaded containers and pallets normally sit two abreast across the width of the airplane, each container or pallet being secured to the main cargo deck on the inside by centerline restraints and on the outboard side by vertical restraints and side locks. Current side locks have a plunger that is extendable to engage a receptacle in the container or the top of the outboard lip of the pallet. As a result, the plunger acts as a vertical restraint for pallets and as both a vertical and horizontal restraint for containers.

End locks are always placed forward and aft of pallets to provide the required horizontal restraint, since the side locks provide none. End locks are also placed forward and aft of most containers to provide horizontal restraint in addition to that provided by the side locks. However, with containers of significant length (e.g., 20 and 40 feet), it is not possible to use end locks at all. Consequently, the sole horizontal restraint for these large containers is that provided by the side locks.

In order for the cargo containers and pallets to be loaded, the distance from the centerline restraints to the outboard vertical restraints and side locks must be slightly greater than the width of the container or pallet. If not, there would not be the clearance required to move the cargo into position. Additionally, it is quite common for containers and pallets to be slightly undersized because the manufacturers do not closely follow the dimensional specifications set for the containers and pallets.

Consequently, the combination of a slight amount of clearance, an undersized container or pallet, and the outboard movement of the side lock due to flexing of the beam upon which it is mounted may lead to the plunger being pulled out of engagement with the container or pallet. When this occurs with a large container not capable of being end locked, the container becomes unrestrained, which can lead to catastrophic events.

As a result, there has been a long-felt need for an outboard side lock for restraining large containers over the wing box section of cargo airplanes that maintains contact with the container even during periods of extreme floor beam flexing. This invention is directed to satisfying this need.

SUMMARY OF THE INVENTION

In accordance with this invention, a lock for restraining the movement of a body is disclosed. The lock includes a base secured to a relative fixed surface, the base having a guideway in which a plunger is slidably mounted. The plunger has formed in it a recess and at least one wall extending generally perpendicular to the bottom of the plunger. An actuator is disposed within the recess and is coupled to a lever means for reciprocal movement, and at least one spring extends between a portion of the actuator and the wall in the plunger. Activation of the lever means moves the actuator toward the body to be restrained, whereby the actuator acts against the spring, which acts against the wall, to urge the plunger into engagement with the body to restrain its movement and to maintain engagement in the event the body attempts to move away from the lock. Deactivation of the lever means causes the plunger to disengage the body, thereby permitting its movement.

BRIEF DESCRIPTION OF THE DRAWINGS

The foregoing and other features and advantages of the present invention will become more readily appreciated as the same becomes better understood by reference to the following detailed description of an embodiment of the invention and the accompanying drawings wherein:

FIG. 4 is a perspective view of the outboard side lock in its extended position, the housing and plunger being partially cut away to show the assembly of internal components;

FIG. 5 is a top view of the outboard side lock in its extended position, the housing and plunger being partially cut away to show the assembly of internal components;

DETAILED DESCRIPTION OF AN EMBODIMENT OF THE INVENTION

Figure 1:
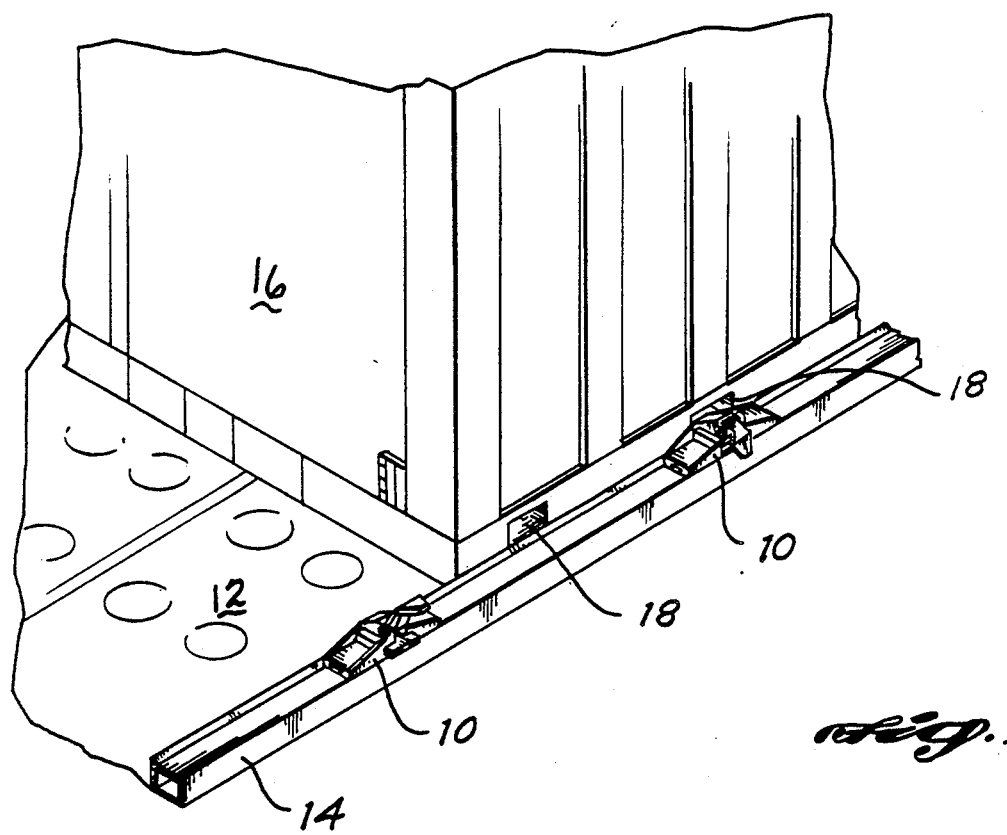
FIG. 1 is an environmental view of an outboard section of an airplane utilizing outboard side locks made in accordance with the principles of the present invention.
Figure 2:
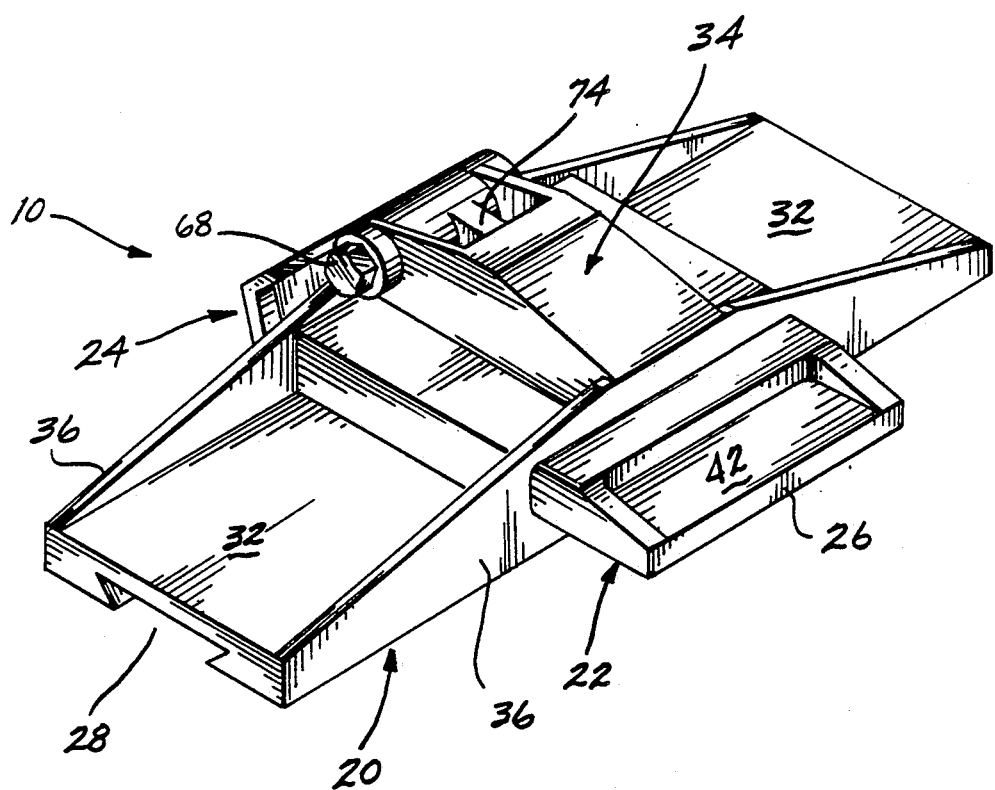
FIG. 2 is a perspective view of the outboard side lock of the present invention, shown in its extended position.

As illustrated in FIG. 1, a series of outboard side locks 10 formed in accordance with the present invention may be employed along each outboard side of the main cargo deck 12 over the wing box section of a cargo airplane. The outboard side locks 10 are mounted to an outboard guide rail 14 and are positioned so as to engage and thereby vertically restrain a cargo body 16, normally a cargo container (illustrated) or pallet. Because cargo containers typically have receptacles 18 that are engaged by the outboard side lock 10, a degree of horizontal restraint is also provided to containers. Typically, the receptacles 18 are spaced so that every other one is engaged by an outboard side lock 10, while the intermediate ones are engaged by outboard vertical restraints (not shown).

The illustrated embodiment of the outboard side lock 10 generally includes a base 20, a plunger 22, and a lever 24 drivingly coupled to the plunger. When the lever 24 is in its upright position (shown only in FIG. 7), the plunger 22 is pulled back to a retracted position such that its leading edge 26 does not extend inboard beyond the base 20. As the lever 24 is moved to its down position, the plunger 22 is moved to an extended position to engage and thereby restrain cargo body 16.

Figure 8:
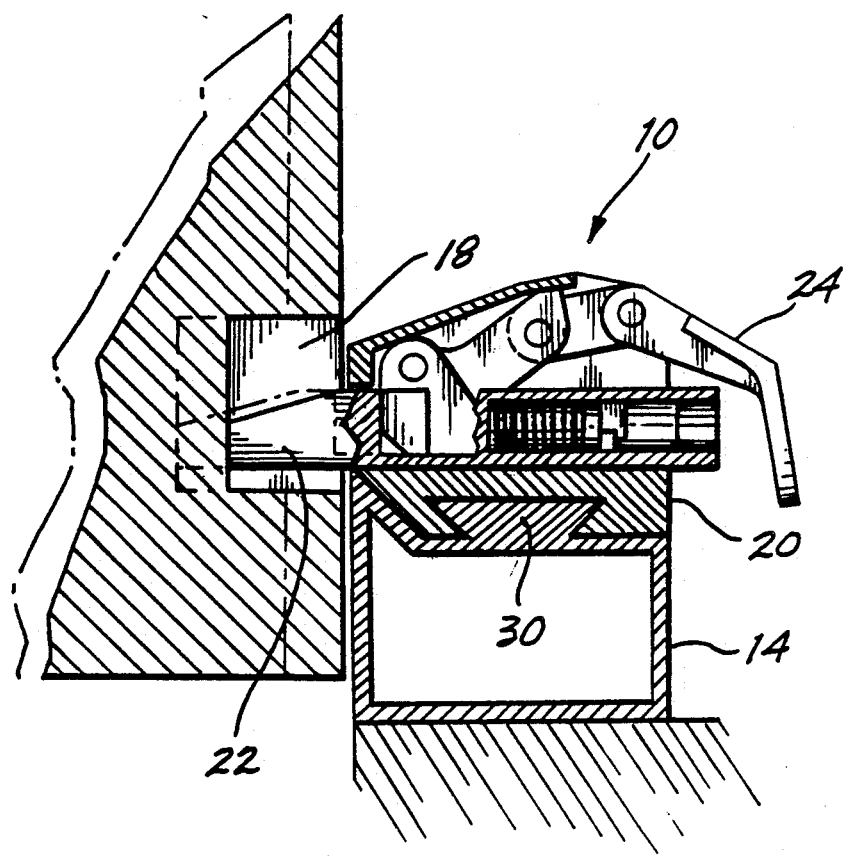

The base 20 includes a recess 28 which runs the entire length of its bottom surface and is configured to mate in dovetail fashion with a raised bar 30 formed in the top of outboard guide rail 14 (see FIG. 8). To prevent the base 20 from moving forward or aft along bar 30, stops (not shown) are placed on either end of the base after it has been positioned on the bar. Of course, the manner in which the outboard side lock 10 is coupled to the outboard guide rail 14 is a matter of design detail and may be varied from the manner illustrated.

The base 20 also includes two flat upper portions 32 which flank a centrally located raised housing 34 serving to support, guide, and protect the internal components of the outboard side lock 10, which will be described in greater detail below. A flange 36 is located on both the inboard and outboard sides of the base 20, each flange sloping upwardly from an elevation matching flat upper portion 32 at each end of the base to an elevation matching housing 34 in the central portion of the base. Each flange 36 contains an aperture sized to accommodate the plunger 22, such that a guideway 38 in which the plunger resides and travels is formed by the apertures and the housing 34. The housing 34 includes a pair of mounting holes 40, disposed on opposite sides of the housing, to which the lever 24 is pivotally mounted.

The plunger 22 is of substantially rectangular design and is dimensioned to be reciprocally movable within guideway 38. The thickness of the plunger 22 is substantially uniform, except that it tapers to a diminished thickness marked by leading edge 26 at the inboard end of the plunger. A flat plateau 42 is formed in the tapered section of the plunger 22 to reduce weight, the plateau 42 extending virtually the entire width of the plunger.

The plunger 22 has a recess 44 formed therein, with an opening to the recess at the top of the plunger. At its inboard end, the recess 44 extends downward and terminates at a platform 46 flush with the bottom surface of the plunger. At its outboard end, the recess extends completely through the bottom surface of the plunger, thereby forming an opening to the recess at the bottom of the plunger, as well. Plunger 22 also includes a pair of bores 48 sized to receive springs 50. The bores extend inwardly on either side of recess 44 from the outboard end of the plunger to a position substantially adjacent the outboard side of platform 46. The inboard terminus of each bore 48 forms an abutment wall 52 for the inboard end of the springs.

Figure 3:
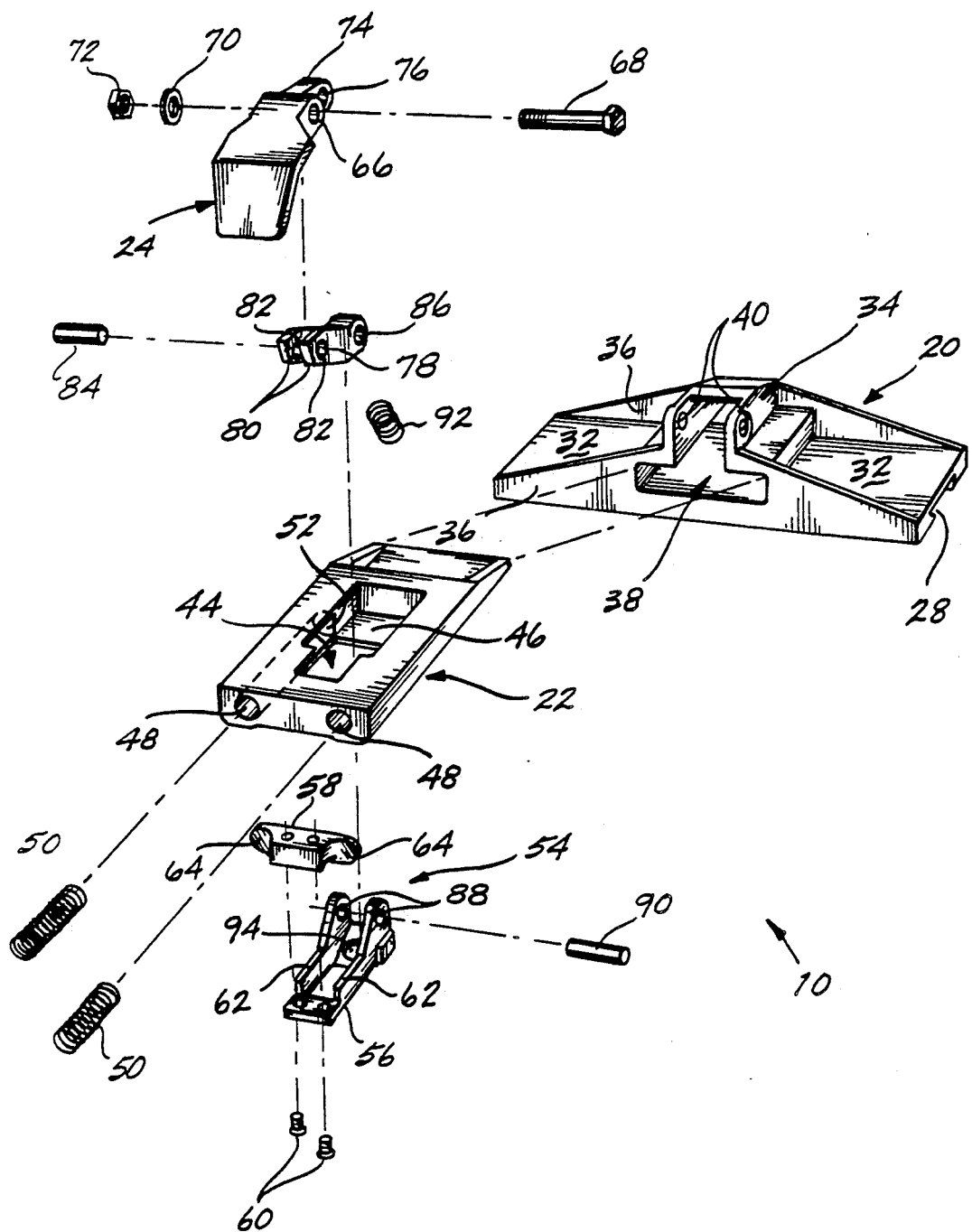
FIG. 3 is an exploded view of the outboard side lock shown in FIG. 2.

An actuator 54 is disposed within recess 44 to assist in providing reciprocal movement of the plunger 22. The actuator 54 is made up of an inboard piece 56 and an outboard piece 58 coupled by screws 60. Inboard piece 56 has two vertical side flanges 62 extending substantially its entire length, and outboard piece 58 has a pair of transverse spring abutting wings 64 that provide an abutment surface for the outboard end of springs 50. Referring to FIG. 3, it will be appreciated that outboard piece 58 must be separately inserted at an angle because its width is wider than the opening to recess 44 at the bottom of the plunger. If the inboard and outboard pieces are connected prior to insertion, the required angling into place could not be accomplished. Thus, the method of assembly should be as follows: insert springs 50 into bores 48, angle outboard piece 58 into place on the outboard end of the springs, and position inboard piece 56 within the recess 44 for attachment to outboard piece 58 via screws 60. When positioned and attached, the inboard end of inboard piece 56 rests upon platform 46.

The lever 24 has a bore 66 extending through it sized to accommodate a bolt 68, the bolt serving to pivotally mount the lever to mounting holes 40 of the housing of base 20. To secure the lever in position, the head of the bolt 68 engages the outside of one of the mounting holes 40, and a washer 70 and a nut 72 engage the outside of the other mounting hole, thereby providing a secure pivot point for the lever. The lever 24 also has an arm 74 extending in an inboard direction and provided with a mounting hole 76.

The lever 24 is drivingly coupled to the actuator 54, and thereby to the plunger 22, through a driving link 78 having a pair of spaced flanges 80 at its outboard end, spaced apart to allow arm 74 to fit therebetween. Each flange 80 contains a hole 82 sized to receive a pin 84, the pin also passing through mounting hole 76 of arm 74 to pivotally mount the outboard end of the driving link 78 to lever 24. Flanges 80 have an upper flat portion 81 which acts as a stop by engaging the inside surface of housing 34 when the plunger has reached its fully extended position. The inboard end of driving link 78 is sized to fit between the vertical side flanges 62 of actuator 54. A bore 86 extends through the inboard end of the link, and holes 88 are formed in each of the vertical side flanges 62, such that a pin 90 may be accommodated and serve to pivotally mount the inboard end of driving link 78 to actuator 54. A spring 92, seated within a recess 94 in the inboard piece 56 of actuator 54, provides upward bias to the bottom surface of the inboard end of the driving link 78, thereby ensuring that the link remains in the same horizontal orientation throughout its entire range of motion.

Figure 6:
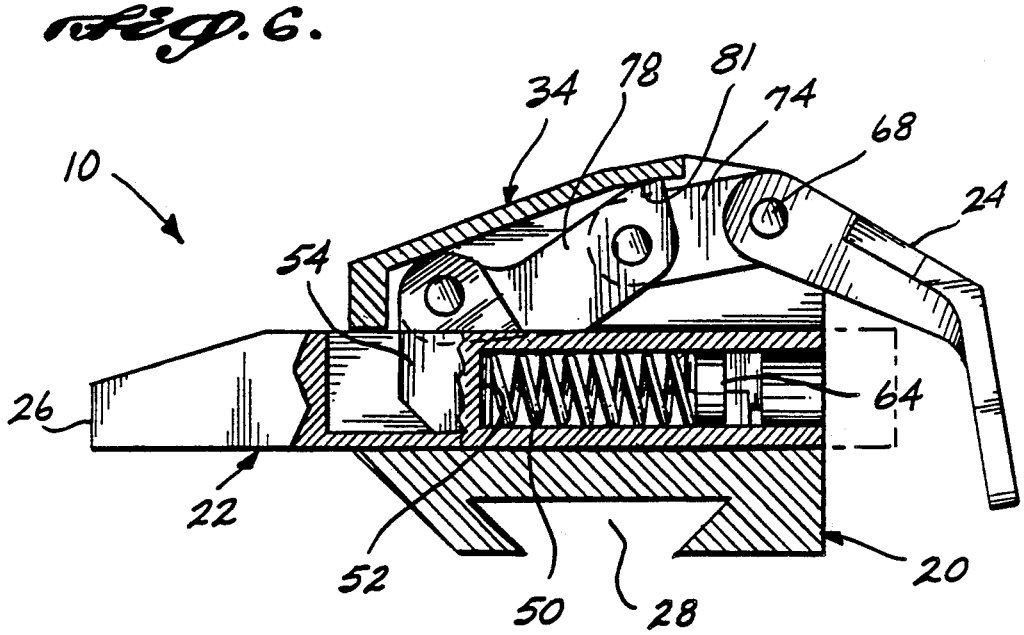
FIG. 6 is a cross-sectional side view of the outboard side lock in its extended position.
Figure 7:
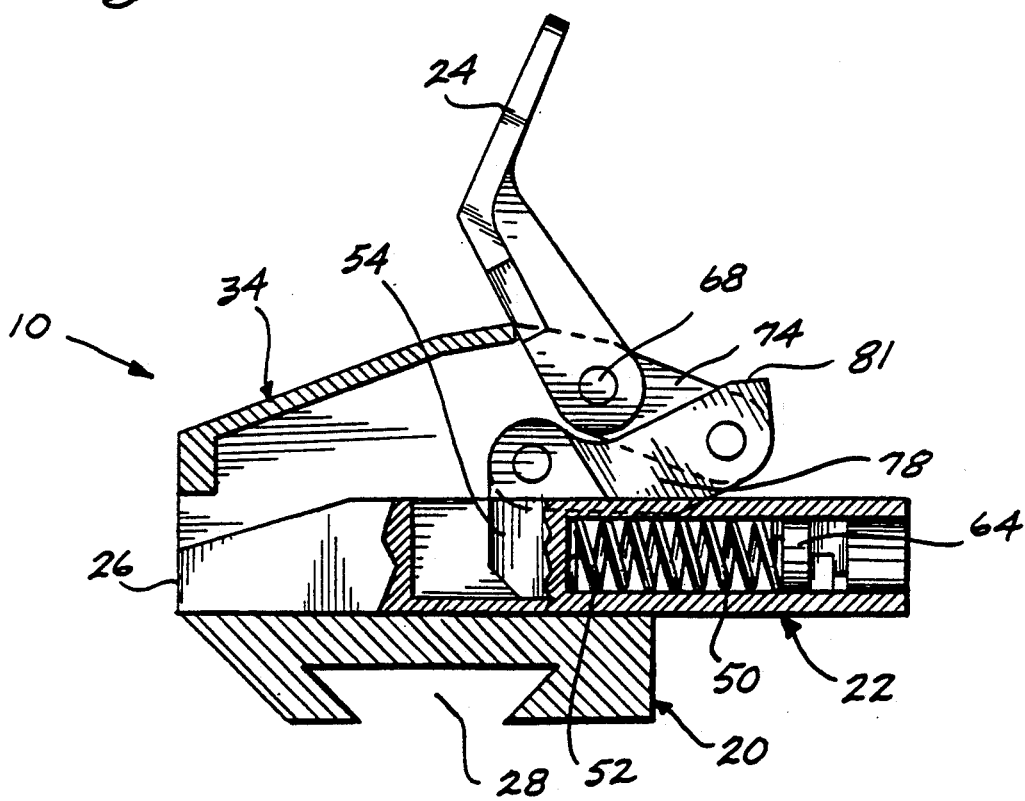
FIG. 7 is a cross-sectional side view of the outboard side lock in its retracted position; and, FIG. 8 is an environmental cross-sectional side view of the outboard side lock in its extended but compressed position, showing the outboard side lock engaging a cargo container.

Operation of the outboard side lock 10 of the present invention is best understood by reference to FIGS. 6, 7, and 8. When the lever 24 is in its fully upright position (shown in FIG. 7), the plunger 22 is pulled back to its fully retracted position, wherein its leading edge 26 does not project inboard beyond base 20. This retracted plunger position is required in order for the cargo containers or pallets to be loaded. As the lever 24 is moved, preferably by foot operation, to its fully downward position (shown in FIG. 6), the arm 74 of lever 24 has been moved to a position inboard of the pivot point of lever 24, marked by bolt 68. Acting through driving link 78, which is stopped by the flat portion 81 of flanges 80 engaging the inside surface of housing 34, actuator 54 has similarly been moved to its furthermost inboard position. Because the actuator 54 is linked to the plunger 22 through its transverse spring abutting wings 64 and the springs 50, the plunger has also moved to its fully inboard extended position. Obviously, the above-described components operate in reverse fashion to return the plunger to its retracted position.

Current side locks are designed so that the plunger engages the inner surface of the receptacle of the cargo container when the plunger is in its fully extended position. With containers presently being used, this corresponds to a fully extended position of approximately 1.0 inches beyond the inboard surface of the base. To simply extend the length of the plunger to provide more extension is not feasible, since it would require replacement of all existing containers with ones having receptacles that could accommodate more than 1.0 inches. However, such an approach could be taken if only pallets were employed to carry airborne cargo.

In contrast, the spring-loaded outboard side lock 10 of the present invention allows the plunger 22 to extend approximately 1.4 inches beyond the inboard surface of the base 20. Because containers currently being used cannot accommodate this full 1.4 inches, the plunger is moved backward to a compressed position wherein only 1.0 inches of extension occurs. This compressed position means that the plunger 22 is under compression by springs 50, and that 0.4 inches of the plunger extend in an outboard position beyond the outboard surface of base 20 (see FIG. 8). As illustrated, there is a significant clearance between the lever 24 and the plunger 22, thereby ensuring that the lever is not inadvertently knocked from its fully downward position by outboard movement of the plunger.

It is this spring-loaded aspect of the plunger 22 of outboard side lock 10 that allows it to compensate for situations where the clearance on either side of the container, the undersizing of the container, and the outboard movement of the outboard guide rail 14 due to flexing of the beam upon which it is located combine to exceed 1.0 inches. Tests have shown that the 0.4 extra inches provided by the present invention is more than enough to overcome even the worst case combination of the above three factors. Thus, the present invention provides an outboard side lock 10 that virtually guarantees the restraint of both cargo containers and pallets. As mentioned above, this guarantee of restraint is particularly critical with large containers incapable of being end locked.

While a preferred embodiment of the present invention has been illustrated and described, it should be understood that variations could be made therein without departing from the spirit and scope of the invention. For instance, while the illustrated invention is primarily intended to be used over the wing box section of a cargo airplane, it could replace current side locks in the remainder of the airplane to provide an added safety factor. Similarly, the present invention could be adapted for use in any environment where the surface holding the lock and the engaged body may move relative to one another. Accordingly, it is to be understood that the invention is not to be limited to the specific embodiment illustrated and described. Rather, the true scope and spirit of the invention is to be determined by reference to the following claims.

The embodiments of the invention in which an exclusive property or privilege is claimed are defined as follows:

1. A lock for restraining the movement of a body, said lock having a plunger extending from a relatively fixed surface to hold the body in a fixed position, said plunger being slidably mounted in a guideway provided in a base secured to the relatively fixed surface, said lock further having a lever means connected to the plunger to cause the plunger to move in and out of engagement with the body to either restrain or permit movement of the body, the improvement comprising:

said plunger having a recess therein, said recess being open at the top and the bottom of said plunger;

an actuator disposed within said recess and coupled to said lever means for reciprocal movement;

at least one wall formed in said plunger extending generally perpendicular to the bottom of said plunger;

at least one spring extending between a portion of said actuator and said wall; and said lever means on said base moving said actuator toward the body to be restrained, whereby said actuator acts against said spring which acts against said wall to urge said plunger into engagement with the body and to maintain said plunger in engagement with the body in the event the body attempts to move away from the lock.

2. The lock of claim 1, wherein said portion of said actuator comprises at least one transverse spring abutting wing engaging said spring.

3. The lock of claim 2, including:
   a pair of walls;
   a pair of springs; and
   a pair of transverse spring abutting wings, wherein one of each pair of walls, springs, and wings is disposed on opposite sides of said recess of said plunger.

4. The lock of claim 2, further comprising at least one vertical side flange extending from said actuator and a driving link connected between said vertical side flange and said lever means.

5. The lock of claim 4, wherein said lever means is pivotally attached to said driving link at a pivot point on said base, whereby rotation of said lever means about said pivot point causes said driving link to urge said actuator and said plunger either into or out of engagement with the body.

* * * * *